United States Patent [19]

O'Brien et al.

[11] 3,856,840

[45] Dec. 24, 1974

[54] ORGANOTIN HETEROCYCLIC COMPOUNDS

[75] Inventors: Joseph L. O'Brien, Southampton; Richard Derby, Huntingdon Valley, both of Pa.

[73] Assignee: Rohm and Haas Company, Philadelphia, Pa.

[22] Filed: Dec. 11, 1972

[21] Appl. No.: 314,208

[52] U.S. Cl..... 260/429.7, 260/45.75 K, 260/556 S, 260/556 AR
[51] Int. Cl........................................ C07f 7/22
[58] Field of Search.................. 260/429.7, 45.75 K

[56] References Cited
UNITED STATES PATENTS

| | | | |
|---|---|---|---|
| 3,518,286 | 6/1970 | Pande et al. | 260/429.7 |
| 3,520,910 | 7/1970 | Lengnick et al. | 260/429.7 |
| 3,647,836 | 3/1972 | Patterson | 260/429.7 |
| 3,697,477 | 10/1972 | Lengnick et al. | 260/429.7 |

*Primary Examiner*—Daniel E. Wyman
*Assistant Examiner*—A. P. Demers

[57] ABSTRACT

Novel N-(hydrocarbon substituted - sulfonyl) - 2,2 dihydrocarbyl - 2, 1, 3 - benzostannathioazolines produced by reacting a N-(hydrocarbyl substituted - sulfonyl) - o aminophenylmercaptan with dihydrocarbyl-substituted tin dihalide or dihydrocarbyl-substituted tin oxide. These compounds are useful as stabilizers for halogen-containing polymers such as polyvinyl chloride.

10 Claims, No Drawings

ORGANOTIN HETEROCYCLIC COMPOUNDS

This invention relates to stable aromatic systems having a benzene ring fused to a heterocyclic ring containing nitrogen, sulfur and tin atoms, and to methods for the preparation of said compounds.

The specific organotin heterocyclic compounds of the invention may be represented by the formula:

(I)
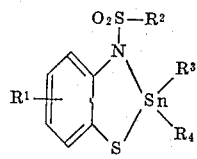

wherein $R^1$ is a group selected from the class consisting of hydrogen, methyl, lower alkyl, halogen, alkoxy, carboalkoxy, trifluoromethyl and a similar substituent or a plurality of these substituents. $R^2$ is a monovalent hydrocarbon radical, selected from the class consisting of alkyl, cycloalkyl, aryl, alkaryl and aralkyl containing no more than 12 carbon atoms. Preferably, $R^2$ is selected from the group consisting of methyl, phenyl and para-tolyl. $R^3$ and $R^4$ are monovalent hydrocarbon radicals selected from the class consisting of alkyl, alkenyl, cycloalkyl, aryl and aralkyl, and preferably methyl, ethyl, propyl, isopropyl, butyl, amyl, hexyl, octyl, xylyl, etc. $R^3$ and $R^4$ can be the same or be different but it is preferred that they be the same and each contain 1 to 18 carbon atoms; preferably $R^3$ and $R^4$ are alkyl groups containing 4 to 12 carbon atoms.

The novel organotin heterocyclic compounds of the present invention are useful as stabilizers in halogen-containing resins and compositions containing these resins. Polyvinyl chloride containing minor amounts of the compounds of the present invention, about ½ to 5 percent based on the weight of the polymer, show improved stability against the degradative effect of heat and or oxygen.

It is well known in the field that organotin compounds are generally highly toxic. Surprisingly, many of the compounds of the present invention have been found to possess relatively low toxicity. To demonstrate this property of the compounds of this invention, feeding tests have shown that N-tosyl-2, 2-dibutyl-2, 1, 3-benzostannathiazoline has an acute oral $LD_{50}$ value in male albino rats of approximately 375 milligrams per kilogram whereas N-benzenesulfonyl-2, 2-dioctyl-2, 1, 3-benzostannathiazoline has a $LD_{50}$ value in male albino rats of greater than 10,000 milligrams per kilogram.

The compounds of the present invention also exhibit anthelmintic activity. For example, N-tosyl-2, 2-dibutyl-2, 1, 3-benzostannathiazoline effectively eradicates tape worm in chickens. The compounds are also useful as fungicides and bactericides; for example, N-benzenesulfonyl-2, 2-dibutyl-2, 1, 3-benzostannathiazoline gave very good results in controlling bean powdery mildew without phytotoxicity.

The organotin heterocyclic compounds of this invention may be prepared by reacting a compound having the structure (II)
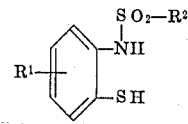

with an organotin compound having the structure (III)

where $R^1$, $R^2$, $R^3$ and $R^4$ have the same significance as given hereinbefore, and X and Y are each selected from the group consisting of halogen, alkoxide and carboxylate or, when taken together, represent an oxygen or sulfur atom.

In addition to compounds of Formula III, related compounds having the structure (IV)
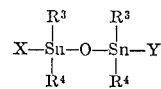

or polymeric derivatives thereof may also be employed. $R^3$, $R^4$, X, and Y have the same significance as given hereinbefore. The starting compounds of Formula II may be prepared by reduction of the corresponding disulfides according to methods described in the literature, for example, J. prakt. Chem. (4) 14, 139 (1961) and Chem. Pharmaceutical Bulletin (Tokyo) 13 (1), 33 (1965). The latter reference employed sodium sulfide for this reduction and reported that difficulties were encountered in isolating the product thiols due to their facile oxidation by air to the original disulfides. We have found that other techniques, such as treatment with zinc and acetic acid or tin and hydrochloric acid, electrolysis in the presence of stannous chloride, etc., can be used for reduction of the disulfide precursors. In particular, reduction with zinc and acetic acid gives good yields of the product thiols which are readily isolated and characterized.

The organotin reagents of Formula III are either available commercially or can be prepared by known procedures. Typical of the reagents of Formula III which may be used are dimethyltin oxide, dibutyltin oxide, diisopropyl tin oxide, di-n-octyltin oxide, di-2-ethylhexyltin oxide, n-octylbutyltin oxide, dibutyltin dichloride, di-n-octyltin dichloride, dibutyltin diacetate, dibutyltin dimethoxide, etc. Typical of the reagent of Formula IV are dibutyl chlorostannoxane, etc.

The reaction between compounds of Formula II and Formula III (or IV) may be carried out in a number of alternative ways. With dialkyltin oxides, condensation is readily effected by refluxing in a hydrocarbon solvent such as benzene, toluene, etc., with removal of the water by azeotropic distillation. When dialkyltin dichlorides are used, the reaction is generally carried out at room temperature or below, in the presence of a base such as sodium methoxide, triethylamine, etc. The organotin heterocyclic compounds of this invention are monomeric in nature, i.e., the molecular weight of the compound corresponds to that of Formula I as shown above.

It is well known in the art that tin-nitrogen bonds are extremely sensitive to chemical attack, for example, hydrolysis. The compounds of this invention, however, are characterized by a surprising degree of stability toward cleavage of the tinnitrogen bond. This may be demonstrated by the fact that the compounds of Formula I may be recovered substantially unchanged after refluxing with alcoholic potassium hydroxide. For example, 3.34 millimoles of N-benzenesulfonyl-2,2-dioctyl-2,1,3-benzostannathiazoline is dissolved in ethanol and 29.2 milliliters of 0.500 N potassium hydroxide in methanol is added. The solution is boiled and any dialkyltin oxide formed, precipitates from the solution. After cooling approximately 91 percent of the original compound is recovered and only about 8 percent of the total amount of dioctyltin oxide present in the original compound is produced. On the other hand, following the same procedure on a mole basis, a compound of the structure

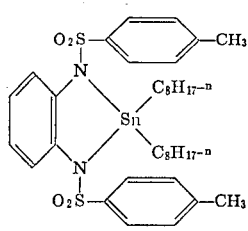

(V)

is totally degraded to N,N'-ditosyl-o-phenylenediamine. The unexpected and peculiar stability of the compounds of this invention is even more surprising in view of the results obtained when the aliphatic versions of the heterocyclic compounds are subjected to these same conditions. For example, when N-tosyl-2,2-dioctyl-stannathiazoline of the formula

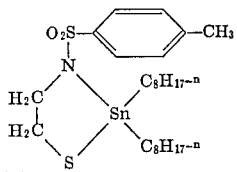

(VI)

is subjected to the same procedure on a mole basis, it is transformed completely into the bis-mercaptide and dioctyl tin oxide.

These tests clearly demonstrate the peculiar stability of the tin-nitrogen and the tin-sulfur bonds of the organotin heterocyclic compounds of this invention. It is believed that there is some resonance in the heterocyclic ring which increases the stability of these bonds.

To assist those skilled in the art to practice the present invention, modes of operation are suggested by way of illustration. In the example, parts and percentages are by weight unless otherwise specifically noted.

The starting materials may be prepared using known techniques such as those described hereinbefore. One group of compounds prepared using such techniques have the general formula

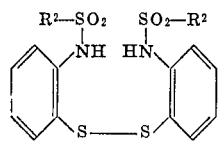

(VII)

(wherein $R^2$ has the same significance as given hereinbefore) to yield the following results:

| For example when $R^2$ is: | Melting Point, °C. |
|---|---|
| $CH_3$- | 142–148 |
| $C_6H_5$- | 150–163 |
| p-$CH_3C_6H_4$- | 158–165 |
| p-$CH_3CONHC_6H_4$- | 212–220 |
| $\beta$-$C_{10}H_7$- | 153–175 |

The foregoing materials may be coverted to compounds of Formula II in the manner illustrated below with di(o-tosylaminophenyl) disulfide. A solution of 80 grams (0.14 mole) di(orthotosylaminophenyl) disulfide in 330 milliliters glacial acetic acid is placed in a 550 milliliter three-necked round bottom flask fitted with a drying tube and an overhead stirrer. Over a ½ hour period, 20 grams (0.31 mole) zinc powder is added. The reaction mixture is refluxed for eighteen hours after which 30 milliliters of concentrated aqueous hydrochloric acid is added. When it is apparent the zinc has reacted, the solution is cooled to room temperature and water added, causing a white precipitate to separate. The precipitate is filtered, washed with water several times and finally dissolved in chloroform. The water and chloroform layers are separated and the latter is dried with anhydrous magnesium sulfate. The magnesium sulfate is removed by filtration and the filtrate is evaporated to dryness at reduced pressure to yield 58 grams (74 percent yield) ortho-tosylaminophenylmercaptan with the following physical and chemical characteristics:

Formula:
(VIII)

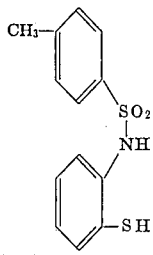

Melting Point: 93–95°C.
Infrared Spectrum: Characteristic NH and SH absorption.

Compounds of Formula II, prepared using the same or similar techniques, yield the following results:

| When $R^2$ is: | Melting Point, °C. |
|---|---|
| $CH_3$ | 89–90 |
| $C_6H_5$ | 109–110 |
| p-$CH_3CONHC_6H_4$ | 217–218 |
| $\beta$-$C_{10}H_7$ | 106–110 |

EXAMPLES I – III

A solution of 93 grams (0.33 mole) ortho-tosylaminophenylmercaptan in 400 milliliters benzene (or toluene, etc.) is placed in a 1 liter three-necked round bottom flask fitted with an overhead stirrer and a Dean-Stark trap topped by a condenser with a drying tube. To the stirred solution is added 83 grams (0.33 mole) di-n-butyltin oxide. The reaction mixture is refluxed and a clear solution is obtained. Water is formed and is azeotroped out of the reaction flask. When the theoretical amount of water, 5.9 milliliters, has been collected, the solvent is removed at reduced pressure. The residue consists of crude N-tosyl-2,2-dibutyl-2,1,3-benzostannathiazoline with a melting point of 152°–154°C. This residue is recrystallized from benzene-hexane to yield 150 grams (88 percent yield) of a product with the following physical and chemical characteristics:

Formula:
(IX)

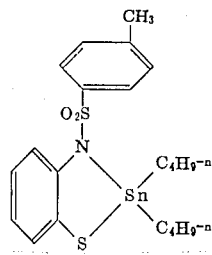

Melting Point: 158°–159°C.
Elemental Analysis:
  Calculated for $C_{21}H_{29}NO_2S_2Sn$: C,49.41%; H,5.69%; N,2.75%; S,12.55%; Sn,23.33%.
Found: C,49.36%; H,5.96%; N,2.89%; S,12.36%; Sn,23.06%.
Molecular Weight: 516±7 (calculated 510)
Compounds of the same general formula (X)

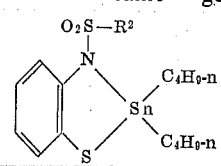

may be prepared using essentially the same techniques to yield the following results:

| For example when $R^2$ is: | Melting Point, °C. |
|---|---|
| $C_6H_5$ | 197–199 |
| $CH_3$ | 78–80 |

EXAMPLES IV – VII

The foregoing may be used with reactants benzenesulfonamidophenylthiol and di-n-octyltin oxide to give an 86 percent yield of N-benzenesulfonyl-2,2-dioctyl-2,1,3-benzostannathiazoline with the following physical and chemical characteristics:

Formula: (XI)

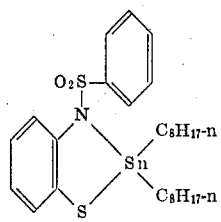

Melting Point: 108°–110°C.
Elemental analysis:
  Calculated for $C_{28}H_{43}NO_2S_2Sn$: C,55.27%; H,7.12%; N,2.30%; S,10.54%; Sn,19.51%.
Found: C,55.22%; H,7.09%; N,2.19%; S,10.31%; Sn,19.16%.
Compounds of the same general formula (XII)

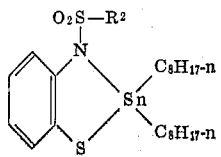

may be prepared using essentially the same technique to yield the following results:

| For example $R^2$ is: | Melting Point, °C. |
|---|---|
| $CH_3$ | Liquid at R.T. |
| para-$CH_3C_6H_4$ | 87–88 |
| $\beta$-$C_{10}H_7$ | 124–125 |

Elemental analysis when $R^2$ is $CH_3$:

| | Calculated for $C_{23}H_{41}NO_2S_2Sn$ | Found |
|---|---|---|
| %N | 2.56 | 2.71 |
| %S | 11.74 | 10.67 |
| %Sn | 21.72 | 22.40 |

Products within the scope of this invention may be prepared by reacting the dipotassium salt of compounds of Formula VII with di-alkyltin dichloride, for example di-n-octyltin dichloride.

An alternative process to prepare the compounds of this invention consists of reacting the compounds of Formula II with a di-alkyltin dichloride in the presence of triethylamine. Upon recrystallization a pure product is obtained.

EXAMPLES VII–XXVI

The procedures outlined above are utilized to produce compounds of the present invention which are preferred specific embodiments:

N-tosyl-2,2-dilauryl-2,1,3-benzostannathioazoline
N-tosyl-2,2-di-2-ethylhexyl-2,1,3-benzostannathioazoline
N-tosyl-2-butyl-2-octyl-2,1,3-benzostannathioazoline
N-tosyl-2-butyl-2-isohexyl-2,1,3-benzostannathioazoline
N-benzenesulfonyl-2-butyl-2-phenyl-2,1,3-benzostannathioazoline
N-benzenesulfonyl-2,2-dicyclohexyl-2,1,3-benzostannathioazoline
N-benzenesulfonyl-2,2-diphenyl-2,1,3-benzostannathioazoline
N-benzenesulfonyl-2,2-dibenzyl-2,1,3-benzostannathioazoline
N-tosyl-2,2-diisopropyl-2,1,3benzostannathioazoline
N-benzenesulfonyl-2,2-ditolyl(isomer mixture)-2,1,3-benzostannathioazoline
N-tosyl-2,2-dixylyl(isomer mixture)-2,1,3-benzostannathioazoline
N-tosyl-2,2-distearyl-2,1,3-benzostannathioazoline
N-methylsulfonyl-2,2-dioctyl-2,1,3-benzostannathioazoline
N-octylsulfonyl-2,2-dioctyl-2,1,3-benzostannathioazoline
N-cyclohexylsulfonyl-2,2-dioctyl-2,1,3-benzostannathioazoline
N-$\beta$-naphthylsulfonyl-2,2-dioctyl-2,1,3-benzostannathioazoline
N-phenethylsulfonyl-2,2-dioctyl-2,1,3-benzostannathioazoline
N-2,3-xylylsulfonyl-2,2-dioctyl-2,1,3-benzostannathioazoline
N-2-anthrylsulfonyl-2,2-dioctyl-2,1,3-benzostannathioazoline The organotin heterocyclic compounds of this invention are useful as thermal stabilizers for poly (vinyl chloride) plastisols. To illustrate this property plastisols containing 100 parts by weight of poly (vinyl chloride), 70 parts of dioctyl phthalate and about 1.7 parts of stabilizer, if any, are placed in an oven maintained in the range of about 170° to 180 °C. The color of the samples are examined after various time intervals for evidence of thermal degradation. The standard, i.e., plastisol without stabilizers, turned dark amber after 15 minutes. Results using stabilizers of the present invention are shown in the following Table in which the stabilizers correspond to those of Formula I wherein $R^1$ is hydrogen and $R^2$, $R^3$ and $R^4$ are as indicated:

| Formula I Compound | | Appearance of Sample After: | | | |
|---|---|---|---|---|---|
| $R^2$ | $R^3, R^4$ | 30 Minutes | 105 Minutes | 195 Minutes | 225 Minutes |
| Tolyl | Butyl | Clear | Lt. Straw | Straw | Dk. Brown |
| Phenyl | Butyl | Clear | Straw | Brown | Brown |
| Methyl | Butyl | Clear | Lt. Straw | Straw | Dk. Brown |
| Tolyl | Octyl | Clear | Lt. Straw | Lt. Amber | Brown |
| Phenyl | Octyl | Clear | Lt. Straw | Dk. Straw | Lt. Amber |
| Methyl | Octyl | Clear | Lt. Straw | Dk. Straw | Lt. Amber |

What is claimed is:

1. Organotin heterocyclic compounds having the formula:

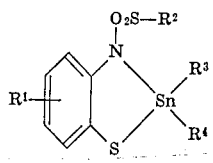

wherein $R^1$ is chosen from the group consisting of hydrogen, halogen, trifluoromethyl, alkoxy, carboalkoxy and lower alkyl or a plurality of them, $R^2$ is an hydrocarbyl radical containing up to 12 carbon atoms and selected from alkyl, cycloalkyl, aryl, alkaryl and aralkyl and $R^3$ and $R^4$ can be the same or different and are each monovalent hydrocarbyl radicals containing 1 to 18 carbon atoms and are selected from alkyl, alkenyl, cycloalkyl, aryl and aralkyl.

2. The compound of claim 1 wherein $R^1$ is hydrogen.

3. The compound of claim 2 wherein $R^3$ and $R^4$ are separately selected from the group of alkyl groups containing up to 18 carbon atoms.

4. The compound of claim 2 wherein the $R^3$ alkyl groups contain 4 to 12 carbon atoms.

5. Organotin heterocyclic compounds according to claim 1 wherein $R^1$ is hydrogen, $R^2$ is chosen from the group consisting of methyl, octyl, phenyl, para-tolyl and naphthyl and $R^3$ and $R^4$ are each alkyl groups containing 4 to 12 carbon atoms.

6. Organotin heterocyclic compounds according to claim 5 wherein $R^3$ is methyl, n-butyl or n-octyl and $R^4$ is methyl, n-butyl, or n-octyl.

7. The compound of claim 1 wherein said compound is N-tosyl-2,2-dibutyl-2,1,3-benzostannathioazoline.

8. The compound of claim 1 wherein said compound is N-benzenesulfonyl-2,2-dioctyl-2,1,3-benzostannathioazoline.

9. A process for the preparation of organotin heterocyclic compounds having the formula:

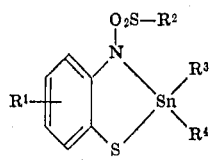

wherein $R^1$ is chosen from the group consisting of hydrogen, halogen, trifluoromethyl, carboalkoxyl and lower alkyl or a plurality of them,
$R^2$ is an hydrocarbyl radical containing up to 12 carbon atoms selected from alkyl, cycloalkyl, aryl, alkaryl and aralkyl,
$R^3$ and $R^4$ are each monovalent hydrocarbon radicals containing 1 to 18 carbon atoms selected from alkyl, alkenyl, cycloalkyl, aryl and aralkyl, any two or more of which may be the same or different,
which comprises reducing a disulfide of the formula

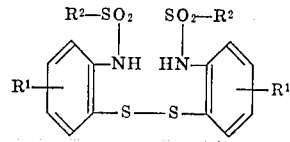

and reacting the resulting mercaptosulfonamide of the formula

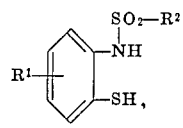

$R^1$ and $R^2$ having the significance given above, with an organotin compound selected from the group consisting of

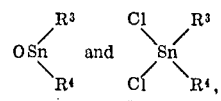

$R^3$ and $R^4$ having the significance given above, and removing therefrom the mercaptohydrogen atom and the hydrogen atom attached to the nitrogen atom and thereby forming a stannathioazoline ring structure.

10. The process of claim 9 wherein the organotin reactant is

* * * * *